May 25, 1948. V. J. TENETY 2,442,102
CONVEYOR TRANSFER MECHANISM FOR PRINTING MACHINES
Filed Feb. 9, 1946 9 Sheets-Sheet 2

INVENTOR
VINCENT J. TENETY
BY Darby & Darby
ATTORNEYS

May 25, 1948.　　　　V. J. TENETY　　　　2,442,102
CONVEYOR TRANSFER MECHANISM FOR PRINTING MACHINES
Filed Feb. 9, 1946　　　9 Sheets-Sheet 5
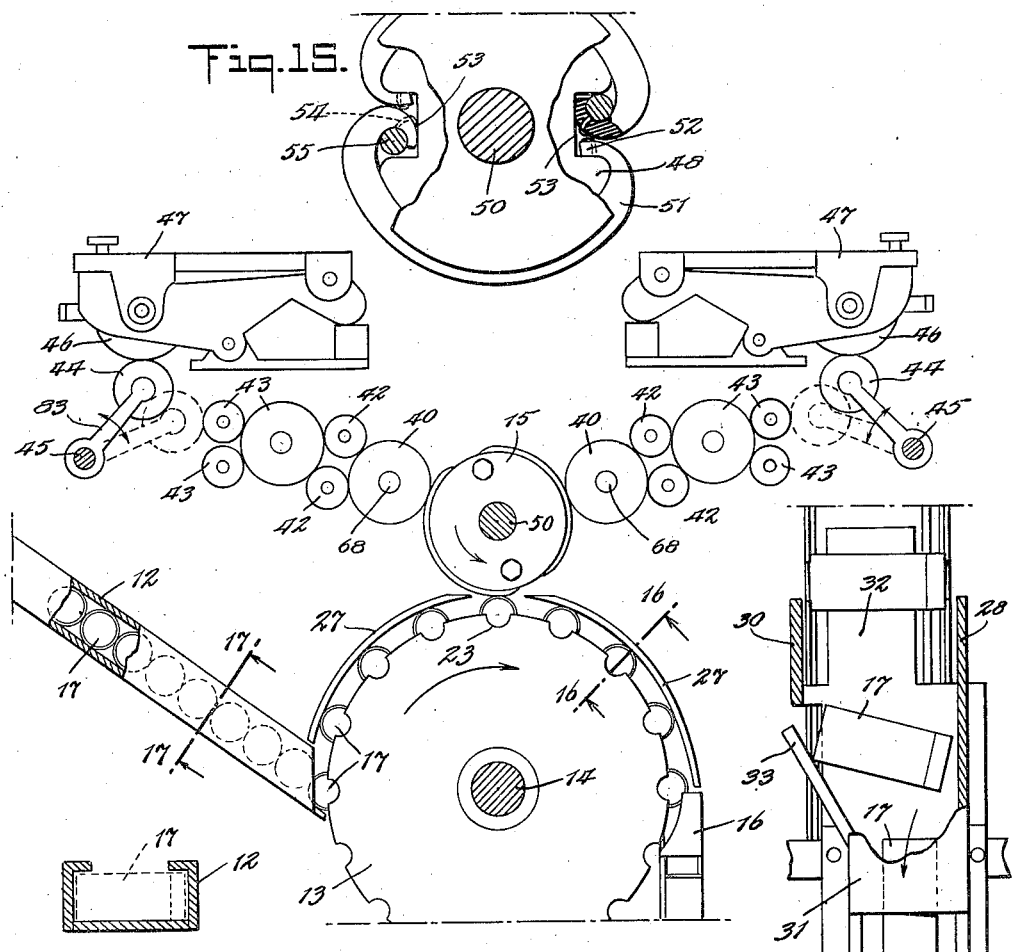
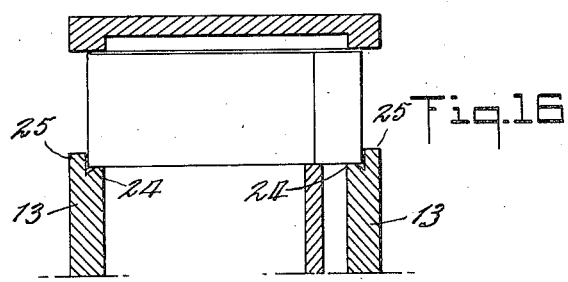
INVENTOR
VINCENT J. TENETY
BY Daly & Daly
ATTORNEYS

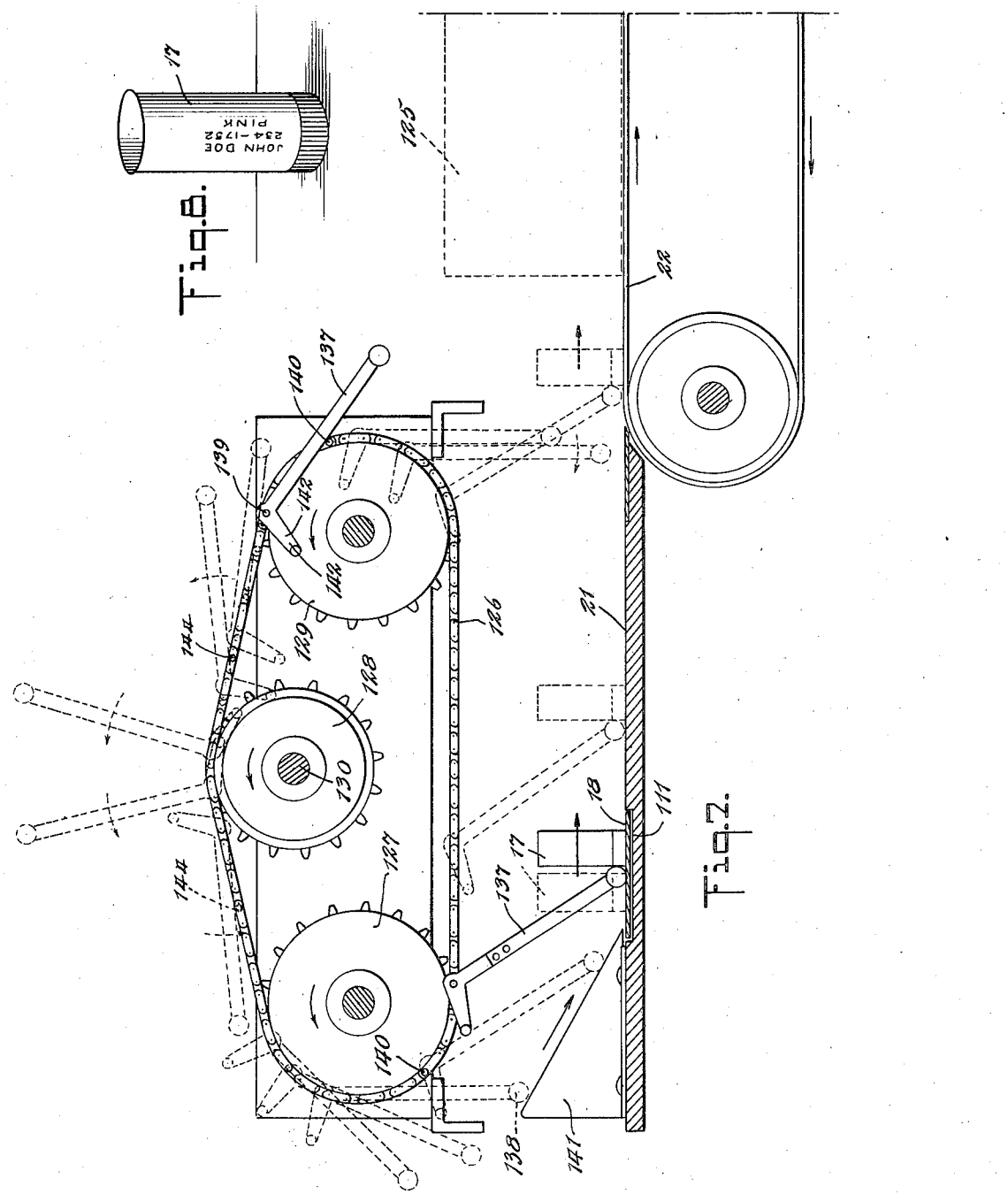

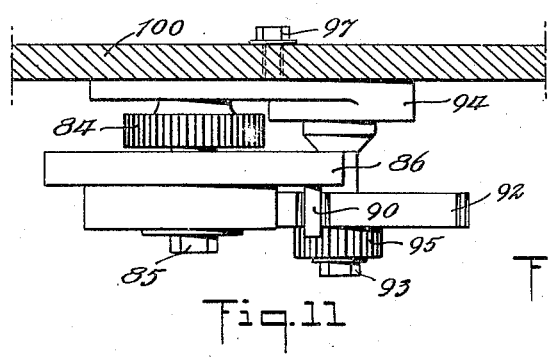
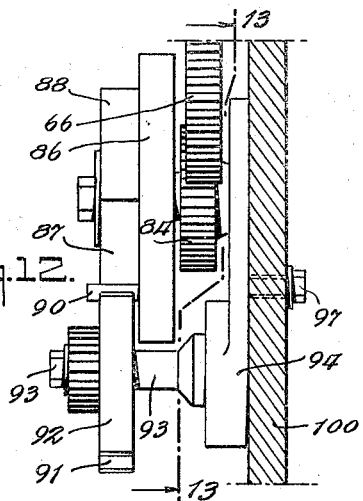
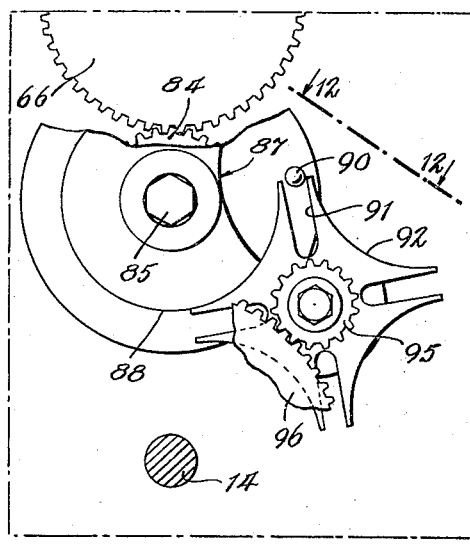
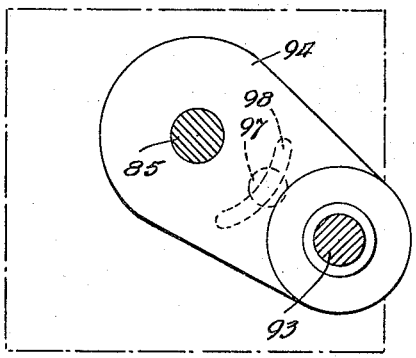
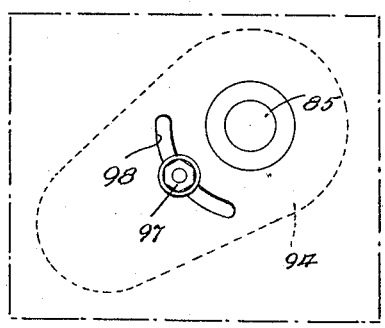

May 25, 1948.  V. J. TENETY  2,442,102
CONVEYOR TRANSFER MECHANISM FOR PRINTING MACHINES
Filed Feb. 9, 1946   9 Sheets-Sheet 9
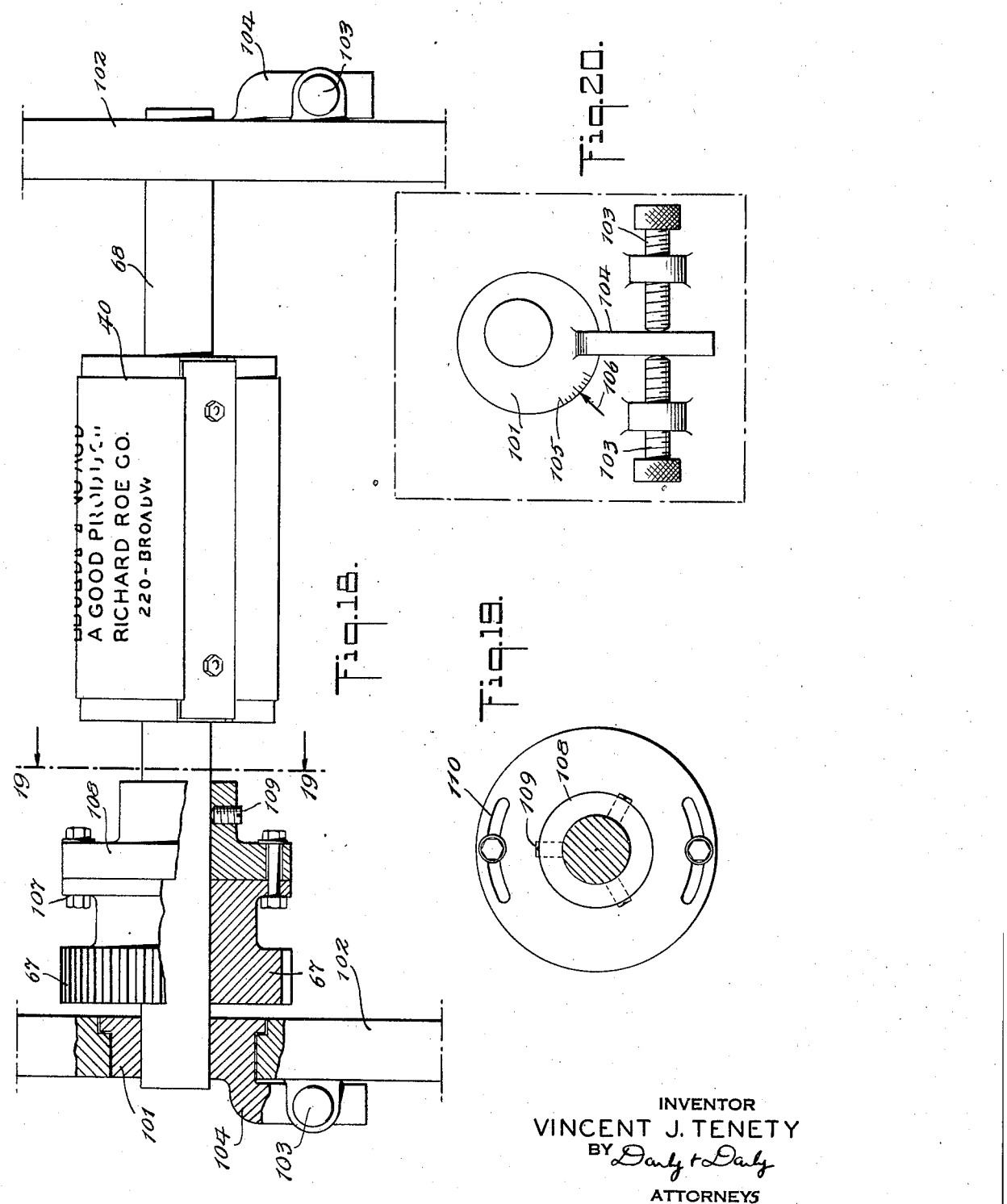
INVENTOR
VINCENT J. TENETY
BY *Daly + Daly*
ATTORNEYS Patented May 25, 1948

2,442,102

UNITED STATES PATENT OFFICE 2,442,102

CONVEYOR TRANSFER MECHANISM FOR PRINTING MACHINES

Vincent J. Tenety, Jersey City, N. J., assignor to Anigraphic Process, Inc., New York, N. Y., a corporation of New York Application February 9, 1946, Serial No. 646,590

5 Claims. (Cl. 198—31)

The present invention relates to a machine for printing on cylinders or objects having curved generally cylindrical surfaces. More particularly still it relates to a machine for printing on cylindrical containers such, for example, as lipstick cases. By means of the present invention containers of generally cylindrical form are automatically fed from a hopper, printed upon by the offset printing method, discharged in a standing position and then fed a plurality at a time in rows onto a conveyor belt which passes into a drying chamber, whereby the printing is dried before final discharge of the articles from the machine.

In printing upon objects such as lipstick containers which are molded, there is frequently a molding burr at an end of the container which makes it difficult to properly rotate the container during the offset printing thereof. By means of the particular feeding means for the containers which are incorporated in the machine of the instant invention, this difficulty is overcome and provision is made for supporting the container so that the burr does not interfere with the rotation imparted to the container by the rubber blanket of the offset printing mechanism.

It is an object of the invention to provide a machine which automatically feeds articles having curved generally cylindrical surfaces from a hopper, prints upon the cylindrical surfaces of the containers, discharges the containers in an upright position upon a belt, and then causes rows of the discharged containers to be transferred to a belt moving transversely to the first mentioned one and to pass through a heated zone for drying the printing.

It is another object of the invention to provide a mechanism for feeding these cylindrical articles to the printing position and to permit rotation of the articles during printing despite the fact that the surface of the article may be roughened as, for example, by a molding burr at one or both ends thereof.

It is another object of the invention to provide a means for transferring a row of articles from a moving belt to another belt at right angles thereto.

It is another object of the invention to provide a machine as mentioned above wherein the printing mechanism is that commonly used in the offset printing process and is, therefore, readily available for incorporation in the machine.

Other objects and features of the invention will appear when the following description is considered in connection with the annexed drawings in which—

Figure 5 is a detail view showing particularly the mode of feeding articles to the printing position, as well as the mode of inking the type roller and transferring the impression thereof to the printing roller or blanket;

Figure 6 is a fragmentary cross-sectional view of the discharge chute or means for causing the articles discharged from the printing means to be turned to assume an upright position for removal by a belt. This figure is partly in section in order to show the details of the chute arrangement;

Figure 7 is a cross-sectional view of the means for removing a row of articles from one belt and conveying them across a platform and onto a belt moving at right angles to the first mentioned belt. This view is taken on the plane of the line 7—7 of Figure 3;

Figure 8 is an illustration of one type of article which may be operated upon by the machine of the instant invention;

Figure 10 is a detail elevational view of the Geneva movement for imparting intermittent motion to the feed means;

Figure 11 is a plan view of the mechanism of Figure 10;

Figure 12 is a fragmentary cross-sectional view taken on the plane of the line 12—12 of Figure 10 and showing particularly the mode by which the Geneva movement of Figures 10 and 11 may be positioned in order to provide for a change of drive ratio between the driving motor and the feeding means;

Figure 13 is a view taken on the plane of the line 13—13 of Figure 12 and illustrating the mode of adjustment of the Geneva movement;

Figure 14 is a view similar to Figure 13 but is taken from the opposite side of the Geneva movement so that the mode of fastening the movement in its adjusted position is clearer;

Figure 15 is a detail view of the mode of holding the resilient rubber printing blanket upon the printing roller;

Figure 16 is a fragmentary cross-sectional view of the periphery of the feeding drums of Figure 5 showing the mode of constructing these drums so that any burrs at the ends of the cylindrical articles may not interfere with their rotation during the printing operation. This cross-section is taken on the plane of the line 16—16 of Figure 5;

Figure 17 is a fragmentary cross-sectional view showing the construction of the feeding chute of Figure 5. This cross-section is taken on the plane of the line 17—17 of Figure 5;

Figure 1:
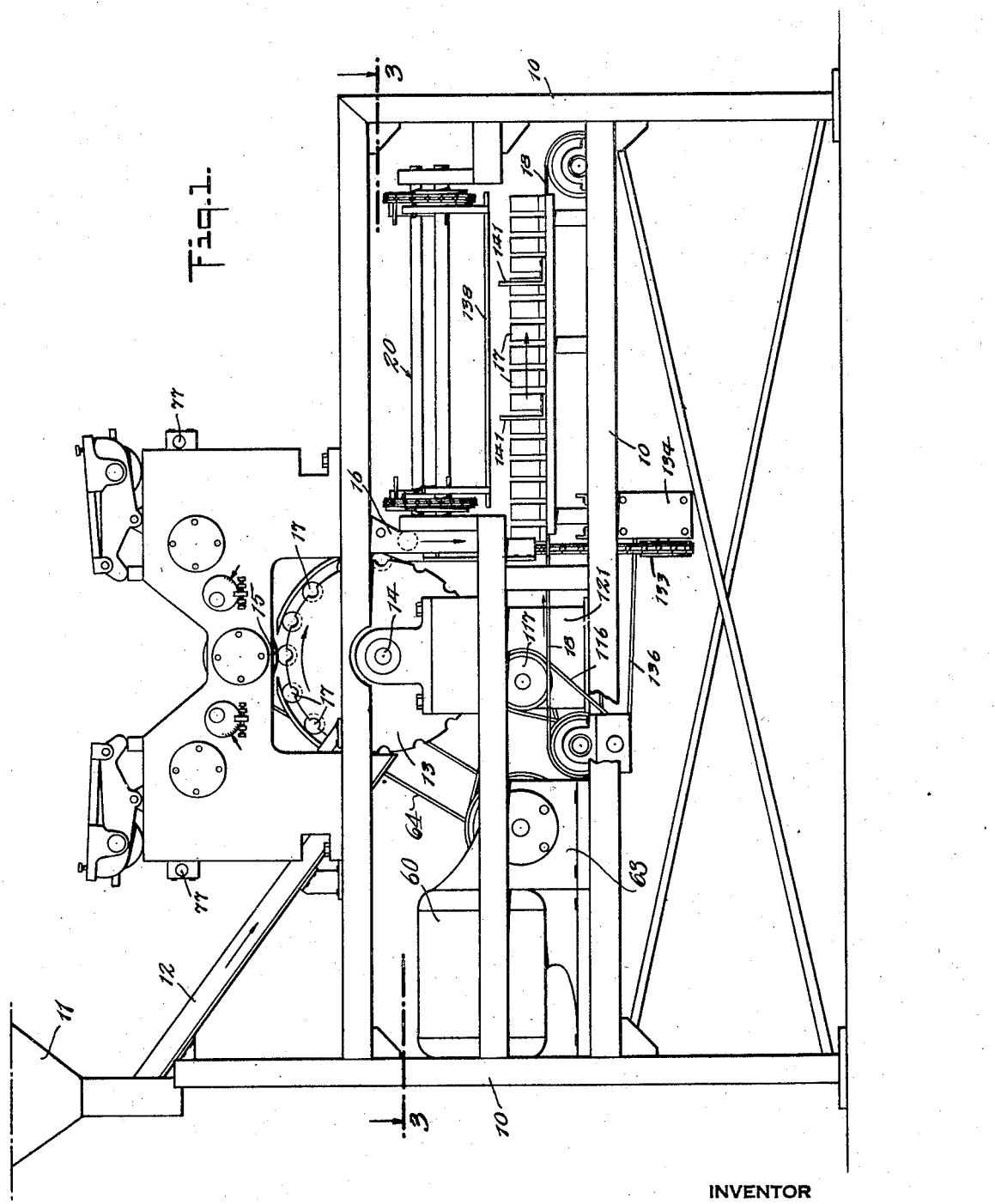
Figure 1 is a side elevational view of the machine of my invention.
Figure 2:
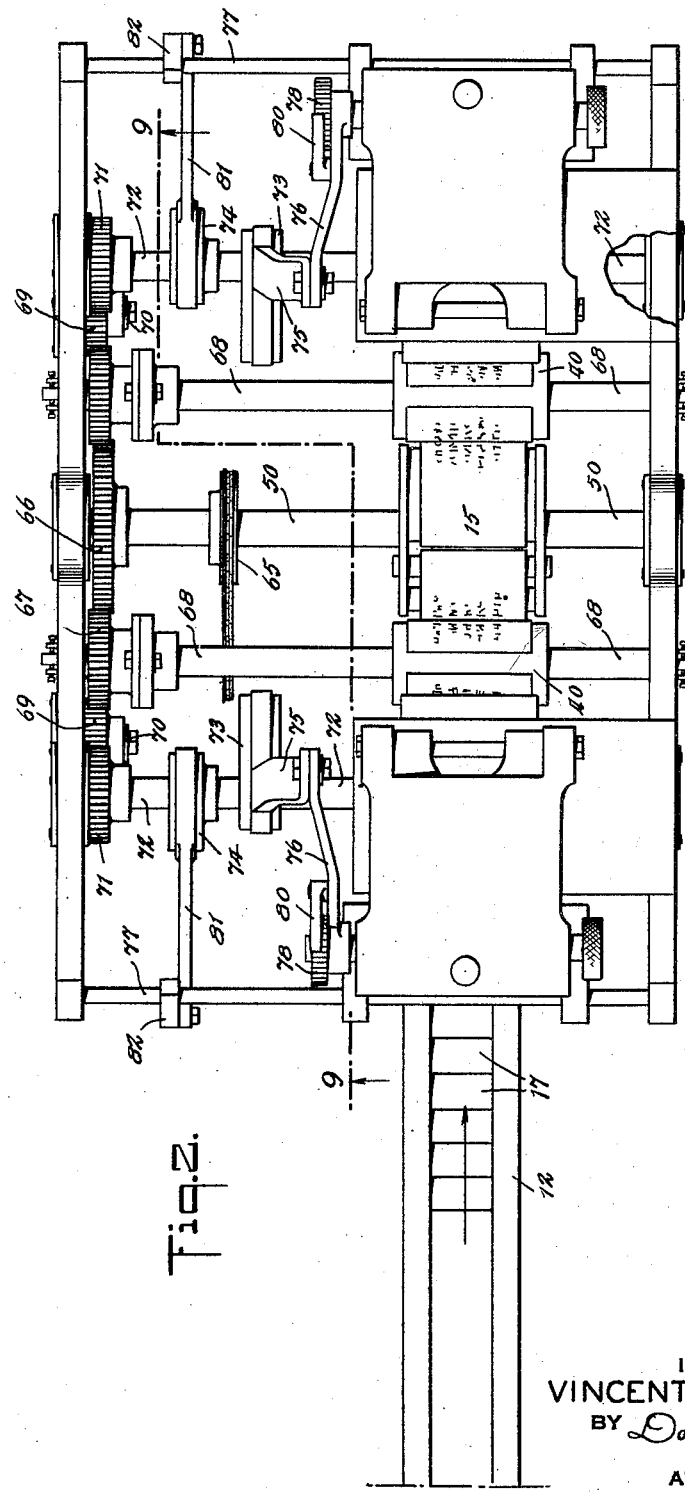
Figure 2 is a top plan view of the machine of Figure 1.

Figure 18 is a detail view of the mode of adjusting the height of the printing roller in order that the pressure may be correct. This view is partially in cross-section in order that the adjusting means may be clear. The view also shows the mode for adjusting the printing blanket angularly with respect to its shaft in order that the printing may register on the proper portion of the article printed upon;

Figure 19 is a cross-sectional view taken on the plane of the line 19—19 of Figure 18 showing additional details of the means for angularly adjusting the printing roller; and Figure 20 is a detail elevational view showing the mode of adjusting the height of the printing roller and its shaft in greater detail than is shown in Figure 18.

Referring now to the drawings, the machine comprises a framework 10 on which is mounted a hopper 11 which communicates with a chute 12. Containers placed in the hopper are guided into the chute and pass through that chute and into semicircular notches in the feed plates 13, which plates are fastened to and rotate with a shaft 14. The plates 13 rotate intermittently under drive of a mechanism later to be described, and when they reach the upper limit of travel are in contact with the printing roller 15 of a common offset printing mechanism. Thereafter the cylindrical articles are released from the plates 13 and are deposited in the discharge chute 16 which is provided with a means hereinafter described to cause the containers to assume an upright position, as indicated at 17, upon the belt 18. At the completion of a row of containers on the belt 18, as indicated in Figure 1, a mechanism generally designated 20 exerts pressure against the bases of all of the containers in the row and moves them transversely of the machine, as seen in Figure 1, across a platform 21 (Figure 7) and onto a second belt 22 which conveys the articles away from the machine and preferably under a bank of infra red lamps which cause drying of the printing on the surfaces of the articles.

Feeding mechanism

The feeding mechanism which has been generally described above consists of three circular plates or discs 13 (Figures 1, 5 and 16). All of these plates are provided with semicircular grooves therein, as indicated particularly in Figure 5 at 23, these grooves being on a circle of greater diameter at their inner surfaces with respect to the two outer plates 13 so that the container rests on the surface 24 and is positioned laterally of the machine by virtue of the upstanding edges 25. The central plate has the same depth groove across its entire surface so that it merely serves as a support for the container, the position of this plate as well as of the two outer plates being adjustable along the supporting shaft 14, each plate being fastened to the shaft by means of its individual set screw 26. By the means just described cylindrical containers, for example, are deposited in the grooves 23 being fed thereto by means of the inclined chute 12. After being deposited in the grooves, the members are retained therein by the arcuate pieces 27 (Figure 5) except at the extreme uppermost part of the travel of the discs 13. At the extreme upper position of the discs 13 the containers are held in the grooves 23 solely by gravity and are in position beneath the printing roller 15 and are rotated by the printing roller during the printing operation. After being printed the containers as they descend along the path of travel of the discs 13 are again held in place by the second of the arcuate pieces 27 until they arrive at a position offset substantially 90° from the printing position at which time they fall into the discharge chute 16. This discharge chute, as is clearly seen in Figure 6, is composed of the upright members 28, 30, 31 and 32 which together form a generally rectangular chute with the upper portion of one wall thereof offset from the lower portion, this upper portion being substantially joined to the lower portion by means of the inclined wall portion 33. As is clearly seen in Figure 4, the uppermost portion of the wall 32 extends beyond the remaining portions and terminates in a bent in member 34 which guides the containers out of the grooves 23 in the discs 13 and causes them to fall into the discharge chute. As they fall one edge will strike the plate 33 thereby causing the container to fall into the smaller constricted portion of the chute in an upright position.

Printing mechanism

The printing mechanism utilized in connection with this machine is in general the mechanism used normally in offset printing machines. It comprises the printing or transfer roller 15 together with the type rollers 40 mounted on shafts 41 and a plurality of inking rollers 42. In addition, there are supplied a plurality of ink feeding rollers 43 and a pair of transfer rollers 44 which rollers are oscillatable about shafts 45 in the usual manner to thereby pick up ink from the primary inking rollers 46 of the customary inking mechanisms 47 and transfer it to the first of the series of ink feeding rollers 43.

The printing roller is constructed in the manner shown particularly in Figure 15 and comprises the generally cylindrical member 48 mounted on the shaft 50. Printing surfaces of rubber or other like material 51 are fastened to the cylinder 48 by means of teeth 52 which protrude from slots 53 in the surface of the roller. After being fastened at one end, the other ends of these rubber strips or blankets are impaled upon the teeth 54 of a comb-like member 55 which is then placed in the slot 53 at the opposite end of the diameter of the cylindrical member 48. The resiliency of the rubber blanket then holds the member in position and the tautness of the rubber may be adjusted by rotating the comb 55 to adjust the effective length of the rubber blanket 51.

Driving means for the feeding and printing mechanisms

The feeding and printing mechanisms are driven from a motor 60 (Figure 1) by means of a number of chains, as will shortly appear. The motor 60 drives a shaft 62 through the intermediary of the gear reduction unit 63 (Figure 1). Shaft 62 carries a sprocket wheel thereon which drives a chain 64 (Figures 1 and 9) which in turn drives the sprocket wheel 65 fixed to the printing roller shaft 50 (see particularly Figure 9). Likewise mounted on the shaft 50 is a gear 66 which meshes with the gears 67 adjustably mounted on shafts 68 in a manner which will hereinafter be described. Gears 67 in turn mesh with gears 69 mounted on the studs 70 and drive the gears 71 on shafts 72.

Figure 9:
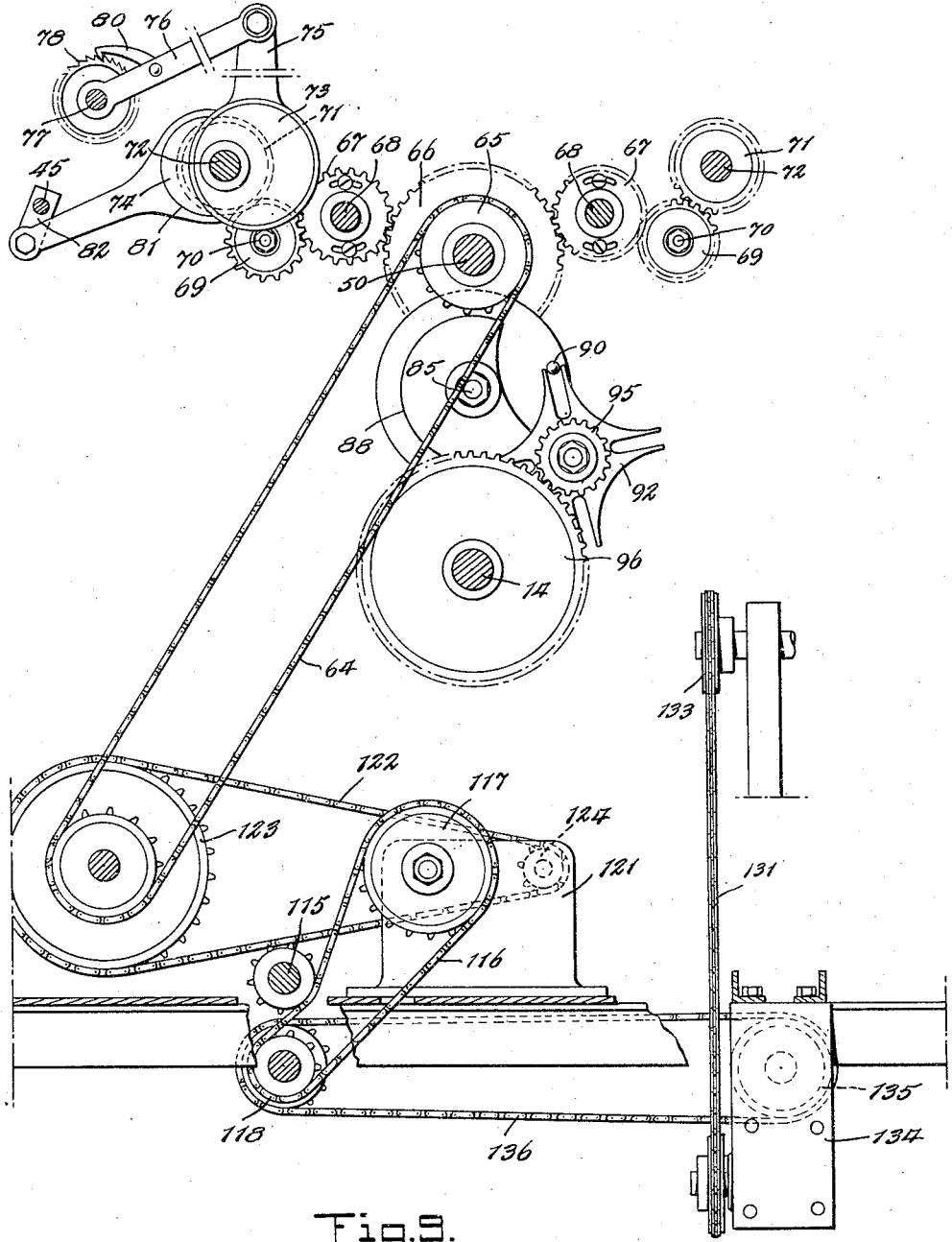
Figure 9 is a fragmentary cross-sectional view of the machine of Figure 1 showing particularly the various driving elements for imparting movement to the feeding means, the printing means and the belt conveyors. This view is taken on the plane of the line 9—9 of Figure 2.

Mounted on each of the shafts 72 is a pair of eccentrics 73 and 74 (the left hand ones only being shown in Figure 9). The strap 75 of eccentric 73 is joined to a link 76 which is pivotally mounted on the shaft 77 of the primary inking roller 46. Mounted on the shaft 77 and fixed thereto is a ratchet wheel 78 with which cooperates a ratchet pawl 80 pivotally mounted on the link 76. Consequently, for each rotation of the shaft 72 the primary inking roller is advanced through one tooth space.

The eccentric strap 81 of the second eccentric 74 is pivotally connected at its end to an arm 82 which is fixed to the shaft 45. The transfer rollers 44 are mounted on arms 83 fixed to the shaft 45 and, consequently at each rotation of the shaft 72 the rollers 44 are moved out of contact with the primary inking rollers 46 and into contact with the first of the series of ink feeding rollers 43. As a result of this construction, the rollers 44 receive ink from rollers 46 and are then oscillated into position in contact with the first of the series of rollers 43 which rollers pick up the ink from rollers 44 and distribute it on to the second in the series of transfer rollers 43. The ink is thus spread upon the inking rollers 42 which are rotating against the surface of the rollers 40 bearing the type plates or impressions so that these type plates are inked on their surfaces and the inked surfaces upon coming in contact with the rubber blanket 51 leave their impression thereon to be transferred in the normal offset printing manner to the containers resting in the grooves 23, as has been previously described.

Gear 66, in addition to driving the gear 67, as has been mentioned, also meshes with a gear 84 mounted on a stud 85. Also mounted on the stud 85 for rotation with the gear 84 is the driving member 86 of a Geneva drive designated 87. This Geneva drive comprises the driving member 86 previously mentioned which has a peripheral generally circular surface 88 having the usual half moon shaped sector cut therefrom. Supported by the member 86 is the Geneva driving pin 90 which cooperates with the slots 91 of the Geneva star wheel 92, the star wheel being mounted on a stud 93 fixed in an arm 94 pivotally mounted on the stud 85 (Figures 10, 11 and 12). As the gear 84 rotates the pin 90 will enter a slot of the star wheel 93 and will thereby cause a quarter turn of the star wheel. Due to cooperation of the periphery of the star wheel with the circular periphery of the member 88 of the Geneva drive there can be no movement of the star wheel except the desired quarter turn for each revolution of the driving member 86.

Integral with the star wheel 92 is a pinion 95 which meshes with a gear 96 mounted on the shaft 14. As a consequence of the construction just above described, the plates 13 are intermittently advanced through the distance between one set of grooves 23 and the following set and containers are advanced one by one to the printing point and retained there during the printing operation.

Inasmuch as it is desirable to be able to replace the plates 13 with plates having grooves of different diameters therein for supporting articles or cylinders of different diameter and inasmuch as different diameters require the articles to remain at the printing point for different periods of time, the mounting of the Geneva star wheel 92 on a stud swingable about the axis of the member 86, i. e., about the stud 85, is provided. Because of this construction it is possible to replace the pinion 95 and gear 96 with a different set having different diameters without necessitating any alteration of the construction since the slots 91 in the star wheel 92 are of sufficient depth to permit of movement of the star wheel about the axis 85 of the driving member 86 of the Geneva movement.

As is clearly seen particularly in Figures 11 through 14, the arm 94 is fastened in its adjusted position by means of a screw or bolt 97 which passes through a slot 99 in a frame member or plate 100 being threaded into the arm 94 to thereby clamp the arm in the adjusted position as mentioned.

Adjustment of the printing mechanisms

As has been indicated hereinabove, the type rollers 40 are adjustable vertically in order that the pressure exerted by them on the rubber printing blankets 51 may be increased or decreased. It might be well to note at this time that the two printing mechanisms heretofore described and the trains of inking and transfer rollers associated therewith are provided in order that two color printing may be performed. In many instances only one of the inking mechanisms will be active. The vertical adjustment of the inking rollers is shown in detail in Figure 18. The shafts 68 are rotatably mounted in the eccentrics 101 which are in turn mounted in the supporting plates 102 which are supported on the framework 10 in the manner indicated in Figure 1. The position of the eccentrics may be adjusted by means of the screws 103 each pair of which cooperate with an arm 104 made integral with one of the eccentrics 101. The face of each eccentric is provided with a scale 105 cooperating with a mark 106 on the plate 102 so that the position of the eccentrics may be known. Thus by adjusting all eccentrics to the same scale position the pressure of the rollers 40 upon the printing blankets may be made equal and brought to a desired point.

Inasmuch as it is, of course, necessary to have the two type rollers 40 operate on different portions of the blankets 51, an adjustment is also provided by means of which the rollers 40 may be angularly adjusted with respect to the shafts 68. This is accomplished in the following manner. Gears 67 which, as has been stated are driven by the gear 66, are freely rotatable upon shafts 68 but are connected by means of the bolts 107 to respective collars 108 which are fixed to the shaft 68 by means of set screws 109. The bolts 107 extend through slots 110 in the collars 108 and, therefore, by loosening the bolts the position of the shafts 68 relative to the respective gears 67 may be determined.

Conveyor mechanism and drive

As has been stated, the containers 17 are discharged in an upright position on to a conveyor belt 18. The upper reach of this conveyor belt operates in a groove 111 in the platform or plate 21 which extends horizontally at one end of the machine, as clearly indicated in Figures 4 and 7. The conveyor belt 18 passes over the pulleys 112 and 113, pulley 113 being the driven pulley of the pair. Drive for pulley 113 is supplied by means of a sprocket wheel 114 mounted on the shaft 115 of the pulley 113. The sprocket wheel is driven by a chain 116 which extends from sprocket wheel 117 to sprocket wheel 118 and meshes with the sprocket wheel 114, as has been stated. Sprocket wheel 117 is mounted on shaft 120 which shaft is driven through the medium of the gear reduction box 121. The input to this gear reduction box is by means of a chain 122 extending between sprocket wheel 123 on shaft 62 and sprocket wheel 124 on the input shaft of the gear reduction box 121. The relationship of the various parts just described may also be seen in Figure 9 as well as in Figures 3 and 4.

The containers moving with the belt 18 which moves quite slowly are moved from this belt in a group or row, as will later be described, and after being pushed across the platform 21 (Figure 7) are deposited upon the conveyor belt 22. The belt 22 is driven in any suitable manner, not shown, and serves to convey the printed upon containers away from the machine and preferably into a heated zone for drying, the enclosure for the heated zone being shown in dotted lines at 125 in Figure 7.

Means for moving containers from one belt to the other

Figure 3:
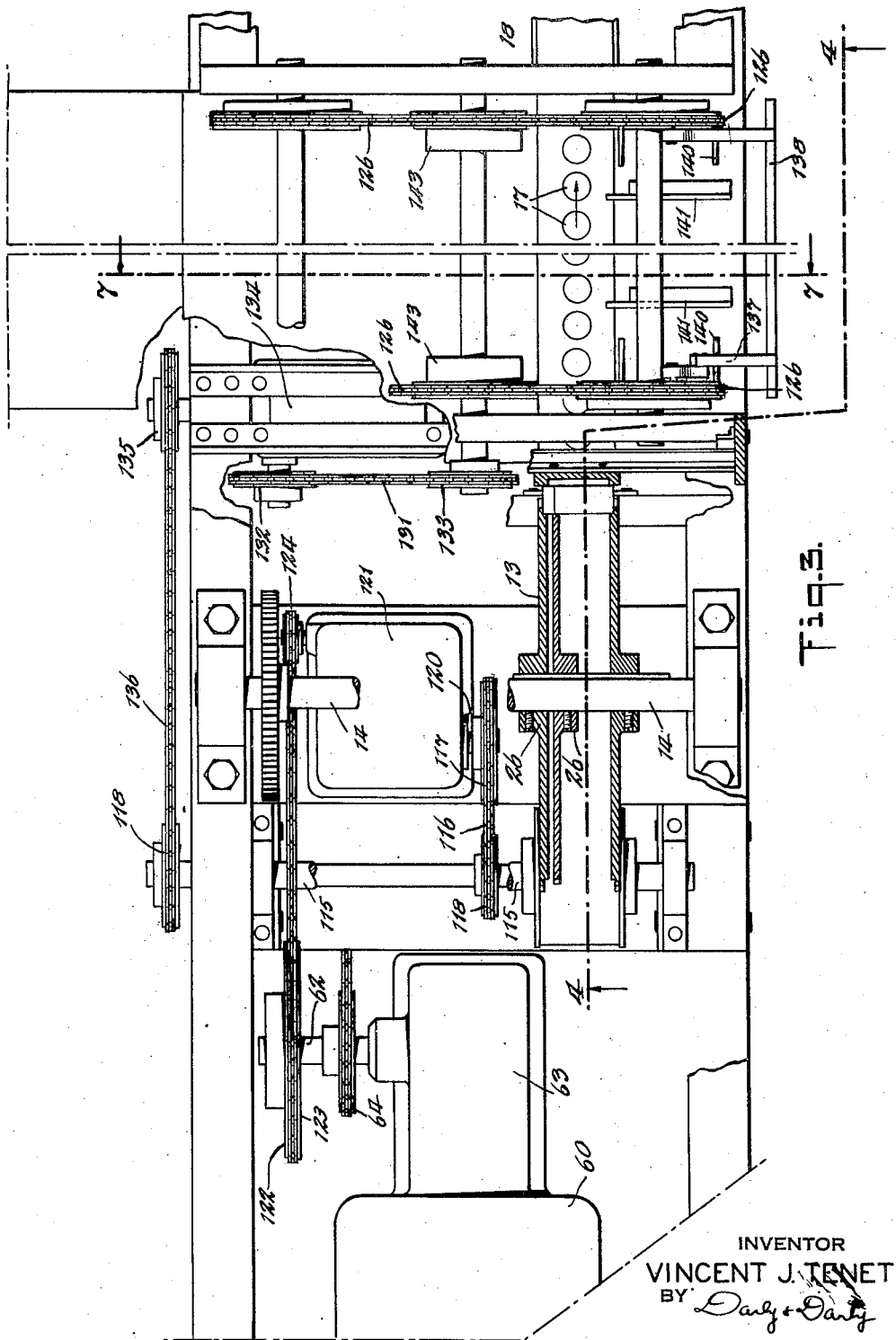
Figure 3 is a horizontal longitudinal cross-sectional view of the machine of Figure 1, the section being taken on the plane of the line 3—3 of that figure.

Mention has been made heretofore of a means for pushing a row of containers from the belt 18 across the platform 21 and onto the conveyor belt 22. This means comprises a pair of sprocket chains 126, which chains pass over the pairs of sprocket wheels 127, 128 and 129. Sprocket wheels 128 are mounted on a shaft 130, which shaft is driven by a chain 131 through the medium of the sprocket wheels 132 and 133 (Figures 3 and 7). The shaft of sprocket wheel 132 is driven through a reduction gear unit 134 by means of the sprocket wheel 135 which is in turn driven from sprocket wheel 118 through the medium of chain 136. The sprocket 118 is driven by the chain 116 in a manner already described.

Chains 126 have pivoted thereto the two pairs of arms 137 which arms are joined at their extremities by the bars 138. Following the pivot points 139 of the bars 137 in the direction of movement of the chains 126, each chain is provided with a long link pin 140. Fixed to the platform 21 to the outside of the belt 18, that is to the left as seen in Figure 7, are a pair of cam plates 141 which cooperate with the bars 138 and cause the bars to assume the position shown in the full lines in Figure 7 to thereby push the containers 17 across the platform 21. As the containers reach the belt 22 and are pushed upon it, the chains 126 reach the position in their movement at which the arms 137 start to be elevated above the surface of the platform 21. Consequently, the arms with their bars 138 are freed from their pressure against the platform 21 and swing away from the containers thereby avoiding a movement which would otherwise cause the containers to be tipped over. The arms 137 in their continued traverse are picked up by the pins 140 reaching the full line position shown near the righthand side of Figure 7. Subsequently as the chains travel the bell cranks 142 formed on the ends of the arms 137 strike the hubs 143 of the sprockets 128. As shown in the successive dotted line positions of Figure 7, this causes the arms 137 to be rotated in a counter-clockwise direction about their pivot points 139 and to be positioned so that they face in the direction of movement of the chains 126. When this operation has been accomplished the arms 137 rest against a set of elongated link pins 144 which lead the pivot points 139 in the direction of travel of the chains 126. Then as the chains continue their movement the dotted line positions shown at the left of Figure 7 successively take place and the arms 137 with their bars 138 finally reach a position in which the arms hang vertically and the bars come into engagement with the cam plates 141 to repeat the operation just described. Although in the present instance two pairs of arms 137 and two bars 138 have been shown as pivoted to the chains 126, it will be understood that the number of arms and bars may be varied, the number being sufficient to move a completed row of containers from the belt 18 at each operation.

Figure 4:
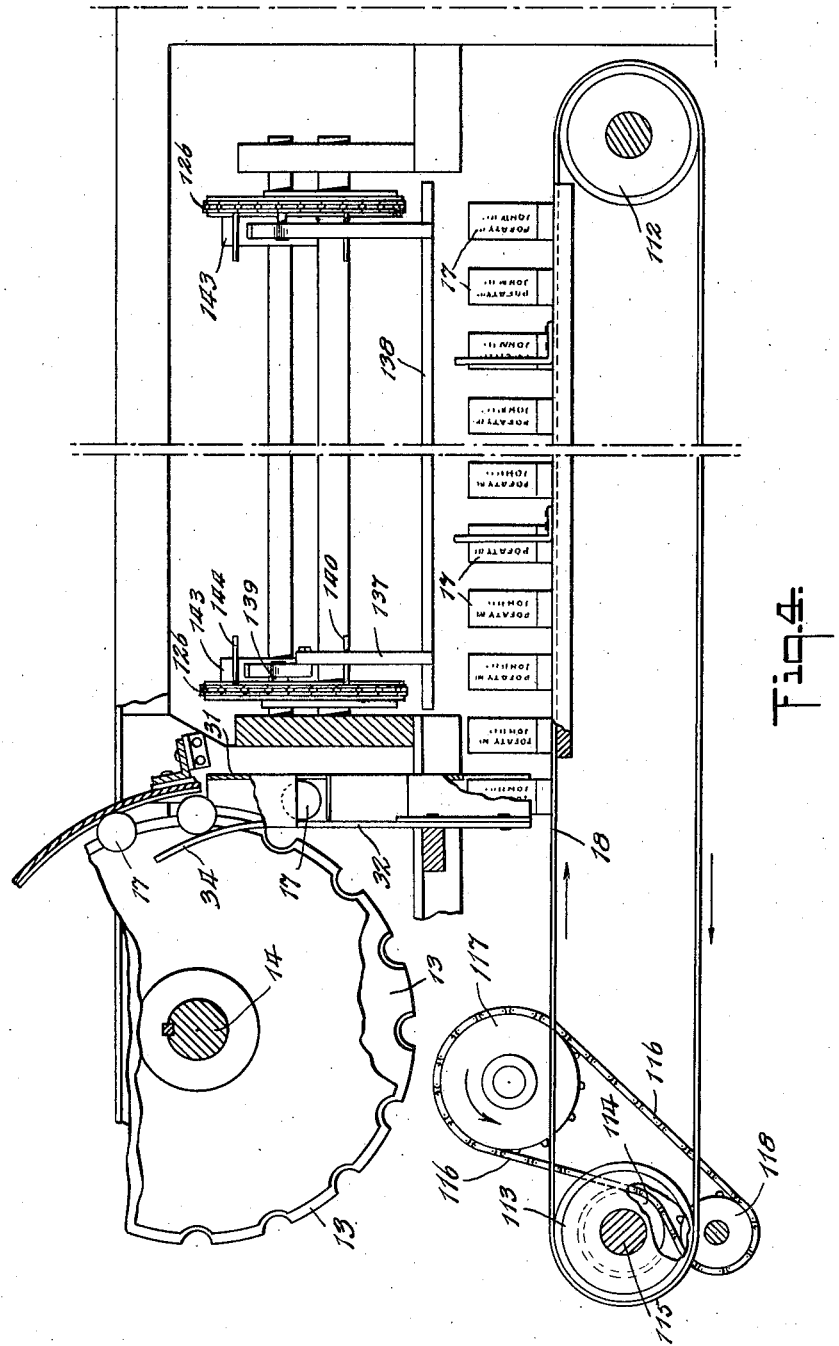
Figure 4 is a combined side elevational and cross-sectional view of the machine of Figure 1 showing particularly the mechanism for discharging the cylindrical articles from the feed means together with the conveyor for removing these articles in a standing position from the discharge means. This figure is taken on the plane of the line 4—4 of Figure 3.

It will be noted by reference to Figures 3 and 4 that the lefthand ones of the arms 137 are made in two parts which are screwed together. This is done in order to make it more readily possible to remove the arms 137 and bars 138 from the machine when necessary and also in order to offset the lefthand arms 137 so that they will not strike and tip over the first container of a following group.

While I have described a preferred embodiment of my invention for purposes of illustration, it will be apparent to those skilled in the art that various modifications are possible without departing from the nature of the invention and I desire, therefore, to be limited only by the scope of the appended claims.

What is claimed is:

1. In a device for removing a row of upright articles from a moving belt and transferring them in a row to a second belt moving at right angles thereto in the same plane, in combination, a platform extending from one belt to the other, an endless conveyor mounted above said platform, a pair of arms pivotally mounted on said conveyor, said arms being of greater length than the distance between the lower reach of said conveyor and the said platform, a bar joining said arms at their ends, means for causing said arms to extend forwardly from said conveyor in the direction of travel of the lower reach thereof and to move across the first belt at right angles to the direction of travel thereof to thereby push a row of articles from said belt and on to said platform and across said platform to the second belt, and means for preventing the said arms and bar from tipping over the articles as they reach said second belt, said means comprising the mounting of the conveyor in a position such that the arms are elevated and permitted to swing free at substantially the moment when the row of articles is deposited on the second belt.

2. In a device for removing a row of upright articles from a moving belt and transferring them in a row to a second belt moving at right angles thereto in the same plane, in combination, a platform extending from one belt to the other, an endless conveyor mounted above said platform, a pair of arms pivotally mounted on said conveyor, said arms being of greater length than the distance between the lower reach of said conveyor and the said platform, a bar joining said arms at their ends, means for causing said arms to extend forwardly from said conveyor in the direction of travel of the lower reach thereof and to move across the first belt at right angles to the direction of travel thereof to thereby push a row of articles from said belt and onto said platform and across said platform to the second belt, means for preventing the said arms from tipping over the articles as they reach said second belt, said means comprising the mounting of the conveyor in a position such that the arms are elevated and permitted to swing free at the moment when the row of articles is deposited on the second belt, means for causing said arms and bars to pivot as they return along the upper reach of said conveyor and to thereby be in position for again cooperating with said means for assuring their forwardly extending position in the direction of travel of the lower reach of the belt.

3. In a device for removing a row of upright articles from a moving belt and transferring them in a row to a second belt moving at right angles thereto in the same plane, in combination, a platform extending from one belt to the other, a pair of endless chains mounted above said platform, the lower reaches of said chains being spaced a predetermined distance above said platform, a plurality of pairs of sprockets over which said chains pass, one pair lying at the end of said platform adjacent said receiving belt and another pair lying on the far side of the articles on the discharge belt, a plurality of pairs of arms each arm of a pair being pivotally mounted on one of said chains, said arms being of greater length than the predetermined distance between said platform and the lower reaches of said chains, a bar joining the outer end of each pair of arms, cam means lying adjacent said discharge belt on the far side thereof, said cam means serving to cause each pair of arms and cooperating bar to extend forwardly in the direction of movement of the lower reach of the chains to thereby engage against the articles and remove them from the belt, and as the chains advance to cause movement of the articles across the platform and onto the receiving belt, said pivotal mounting of said arms on said chains and the positions of said sprockets causing the arms to be elevated immediately upon the reception of the articles on the receiving belt, whereby the arms and bars swing free and prevent the tipping over of the articles, means comprising long link pins in the chains in position following the said arms to cause the said arms to be elevated as the chains continue their movement, and means for rotating the arms through substantially 180° as they traverse the upper reaches of the chains to thereby reposition the said arms for cooperation with the said cam means.

4. In a device for removing a row of upright articles from a moving belt and transferring them in a row to a second belt moving at right angles thereto in the same plane, in combination, a platform extending from one belt to the other, a pair of endless chains mounted above said platform, the lower reaches of said chains being spaced a predetermined distance above said platform, a plurality of pairs of sprockets over which said chains pass, one pair lying at the end of said platform adjacent said receiving belt and another pair lying on the far side of the articles on the discharge belt, a plurality of pairs of arms each arm of a pair being pivotally mounted on one of said chains, said arms being of greater length than the predetermined distance between said platform and the lower reaches of said chains, a bar joining the outer ends of each pair of arms, cam means lying adjacent said discharge belt on the far side thereof, said cam means serving to cause each pair of arms and cooperating bar to extend forwardly in the direction of movement of the lower reach of the chains to thereby engage against the articles and remove them from the belt, and as the chains advance to cause movement of the articles across the platform and onto the receiving belt, said pivotal mounting of said arms on said chains and the positions of said sprockets causing the arms to be elevated immediately upon the reception of the articles on the receiving belts, whereby the arms and bars swing free and prevent the tipping over of the articles, means comprising long link pins in the chains in position following the said arms to cause the said arms to be elevated as the chains continue their movement, a bell crank extension on each of said arms, and cam means along the upper reaches of said chains adapted to cooperate with said bell crank extensions to rotate said arms about their pivot points through susbtantially 180° to thereby position said arms and bars for cooperation with said first mentioned cam means.

5. In a device for removing a row of upright articles from a moving belt and transferring them in a row to a second belt moving at right angles thereto in the same plane, in combination, a platform extending from one belt to the other, a pair of endless chains mounted above said platform, the lower reaches of said chains being spaced a predetermined distance above said platform, a plurality of pairs of sprockets over which said chains pass, one pair lying at the end of said platform adjacent said receiving belt and another pair lying on the far side of the articles on the discharge belt, a plurality of pairs of arms each arm of a pair being pivotally mounted on one of said chains, said arms being of greater length than the predetermined distance between said platform and the lower reaches of said chains, a bar joining the outer ends of each pair of arms, cam means lying adjacent said discharge belt on the far side thereof, said cam means serving to cause each pair of arms and cooperating bar to extend forwardly in the direction of movement of the lower reach of the chains to thereby engage against the articles and remove them from the belt, and as the chains advance to cause movement of the articles across the platform and onto the receiving belt, said pivotal mounting of said arms on said chains and the positions of said sprockets causing the arms to be elevated immediately upon the reception of the articles on the receiving belts, whereby the arms and bars swing free and prevent the tipping over of the articles, means comprising long link pins in the chains in position following the said arms to cause the said arms to be elevated as the chains continue their movement, a bell crank extension on each of said arms, cam means along the upper reaches of said chains adapted to cooperate with said bell crank extensions to rotate said arms about their pivot points through substantially 180° to thereby position said arms and bars for cooperation with said first mentioned cam means, and elongated link pins in the chains lying forwardly of the arms in the direction of travel of the chains to support said arms subsequent to their rotation and prior to their next cooperation with said first mentioned cam means.

VINCENT J. TENETY.

REFERENCES CITED

The following references are of record in the file of this patent:

UNITED STATES PATENTS

| Number | Name | Date |
|---|---|---|
| 788,396 | Elrod | Apr. 25, 1905 |
| 1,064,277 | Baxter | June 10, 1913 |
| 1,586,310 | Johnson | May 25, 1926 |
| 1,740,582 | Farmer | Dec. 24, 1929 |
| 1,869,767 | Nagle | Aug. 2, 1932 |
| 2,088,196 | Friden | July 27, 1937 |
| 2,144,761 | Herold | Jan. 24, 1939 |
| 2,250,427 | Vannucci | July 22, 1941 |
| 2,252,937 | Link et al. | Aug. 19, 1941 |
| 2,309,696 | Friden | Feb. 2, 1943 |
| 2,341,409 | McDonnell | Feb. 8, 1944 |
| 2,399,630 | Friden | May 7, 1946 |